(12) United States Patent
Krupka

(10) Patent No.: US 7,224,724 B2
(45) Date of Patent: May 29, 2007

(54) REDUCED ALPHABET EQUALIZER USING ITERATIVE EQUALIZATION

(75) Inventor: Eyal Krupka, Ramat-Gan (IL)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 09/901,413

(22) Filed: Jul. 9, 2001

(65) Prior Publication Data
US 2003/0007552 A1    Jan. 9, 2003

(51) Int. Cl.
*H03H 7/30* (2006.01)
(52) U.S. Cl. ..................................... 375/229
(58) Field of Classification Search ............... 375/229, 375/230, 233
See application file for complete search history.

(56) References Cited
U.S. PATENT DOCUMENTS
6,366,612 B1 * 4/2002 Kakura et al. .............. 375/230

6,618,451 B1 * 9/2003 Gonikberg .................. 375/341
2002/0007257 A1 * 1/2002 Riess et al. ................... 703/2

OTHER PUBLICATIONS

Duel-Hallen, Alexandra, et al., "Delayed Decision-Feedback Sequence Estimation", *IEEE Transactions on Communications*, vol. 37, No. 5, (May 1989),428-436.

* cited by examiner

*Primary Examiner*—Kevin Kim
(74) *Attorney, Agent, or Firm*—Schwegman, Lundberg, Woessner & Kluth, P.A.

(57) ABSTRACT

An iterative equalization process uses a reduced complexity equalizer as a first stage in the equalization process and a reduced alphabet MLSE equalizer as a later stage. The reduced complexity equalizer is used to identify a reduced alphabet including symbols having a higher probability of representing an actual transmitted symbol. The reduced alphabet is then used as the alphabet for the reduced alphabet MLSE equalizer.

25 Claims, 3 Drawing Sheets

REDUCED ALPHABET EQUALIZER USING ITERATIVE EQUALIZATION

FIELD OF THE INVENTION

The invention relates generally to communication devices and systems and, more particularly, to equalization techniques and structures for use within such devices and systems.

BACKGROUND OF THE INVENTION

Equalization is a signal processing technique that is implemented in a communication system to reduce or compensate for certain effects (e.g., inter symbol interference (ISI)) experienced by a communication signal as it propagates through a communication channel. One form of equalization that is widely used in wireless communication systems is maximum likelihood sequence estimation (MLSE) equalization. The MLSE technique (which typically makes use of the Viterbi algorithm) represents an optimal equalization approach (e.g., optimal error performance) in a communication system. However, when used in a system having a large symbol alphabet and a channel with a large memory length, the full-state MLSE equalization approach can be prohibitively complex. Various techniques have been developed for reducing the complexity of the MLSE algorithm including, for example, collapsing a number of trellis states into a smaller number of states (effectively shortening the length of the equalizer), using delayed decision feedback techniques, and using coset partitioning. However, the error performance of these lower complexity equalization techniques is often significantly less than the performance of the full-state MLSE algorithm.

DETAILED DESCRIPTION

Figure 1:
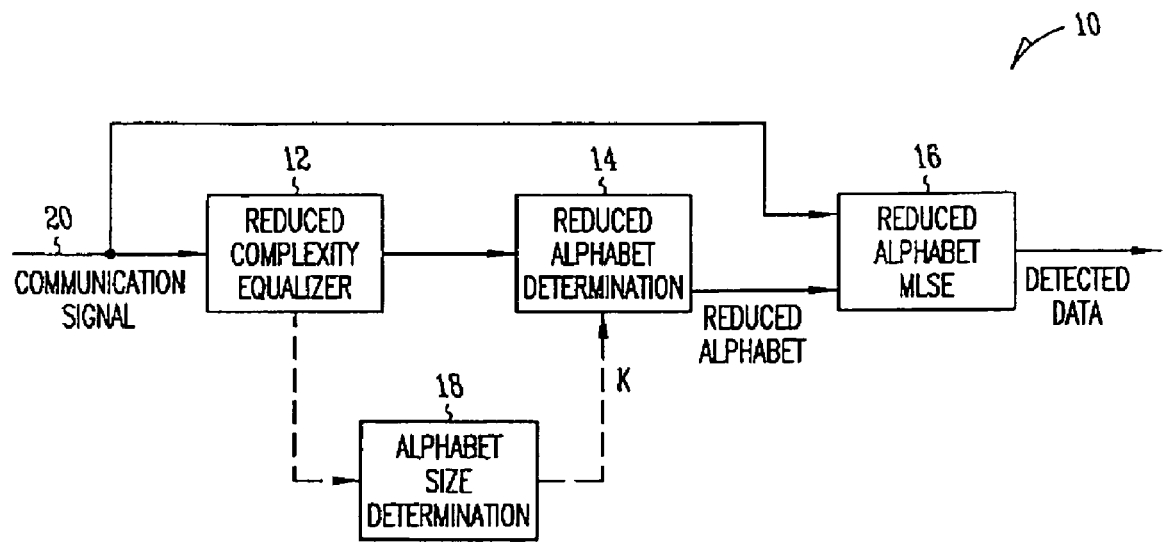
FIG. 1 is a block diagram illustrating an equalization system in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to structures and techniques for performing equalization within a communication device that are less complex than the well known full-state, full-alphabet MLSE equalizer. In a preferred embodiment, an iterative equalization approach is implemented that uses a reduced complexity equalizer as a first iteration in the equalization process and a full-state MLSE equalizer as a second iteration. The reduced complexity equalizer is used to identify a subset of symbols from the full symbol alphabet that have a higher probability of being the actual transmitted symbol than other symbols in the full alphabet. This subset of symbols is then used as a reduced alphabet for the full-state MLSE equalizer. Because the size of the alphabet has been reduced, the complexity of the full-state MLSE equalizer is reduced considerably. In at least one implementation, the combined complexity of the first and second iterative stages is significantly less than the total complexity of the full-state, full-alphabet MLSE equalizer. Iterative techniques using greater than two iterations can also be implemented. The inventive principles are capable of producing error performance levels that are greater than those of other reduced complexity equalization schemes. In fact, error performance levels approaching or even equaling those of the full-state, full-alphabet MLSE equalizer are believed possible.

FIG. 1 is a block diagram illustrating an equalization system 10 in accordance with an embodiment of the present invention. As illustrated, the equalization system 10 includes: a reduced complexity equalizer 12, a reduced alphabet determination unit 14, and a reduced alphabet MLSE equalizer 16. An optional alphabet size determination unit 18 may also be provided. The equalization system 10 receives a communication signal at an input node 20 that was received from a communication channel (e.g., a wireless communication channel). The communication signal includes a number of data symbols that need to be detected. While propagating through the channel, these data symbols were acted upon by one or more effects within the channel (e.g., inter-symbol interference (ISI)) that distorted the symbols, making it more difficult to accurately detect the transmitted symbols within the received signal. The equalization system 10 is designed to increase the accuracy with which data in the received communication signal is detected (i.e., increase the symbol error rate performance).

The equalization system 10 uses an iterative equalization approach. In a first iteration, the reduced complexity equalizer 12 processes the communication signal in a known manner. The reduced complexity equalizer 12 is less complex than a full-state, full-alphabet MLSE equalizer would be for the same communication channel. As will be appreciated, many different reduced complexity equalization schemes are available. The reduced complexity equalizer 12 generates an output signal that is delivered to the reduced alphabet determination unit 14. In one approach, for each input symbol within the communication signal, the reduced alphabet determination unit 14 identifies a subset of symbols from the full alphabet that are more likely than other symbols to be the actual transmitted symbol. The reduced alphabet determination unit 14 does this based on the output of the reduced complexity equalizer 12. The subset of symbols identified by the reduced alphabet determination unit 14 is referred to as the reduced alphabet.

The reduced alphabet determination unit 14 delivers the reduced alphabet to the reduced alphabet MLSE equalizer 16 which then processes the communication signal based on the reduced alphabet. In a preferred approach, the reduced alphabet MLSE equalizer 16 is a full-state MLSE equalizer (i.e., it has a length comparable to the memory length of the channel). However, instead of testing the communication signal for all possible symbols in the full alphabet, the reduced alphabet MLSE equalizer 16 only checks the symbols in the reduced alphabet (e.g., it only evaluates trellis paths corresponding to the symbols within the reduced alphabet), thus reducing the overall complexity of the MLSE considerably. The reduced alphabet MLSE equalizer 16 then outputs the symbol from the reduced alphabet that most likely represents the corresponding transmitted symbol. In a preferred implementation, the combined complexity of the reduced complexity equalizer 12 and the reduced alphabet MLSE equalizer 16 is significantly less than the complexity of a comparable full-state, full-alphabet MLSE equalizer. In addition, in at least one embodiment, the symbol error rate performance of the equalization system 10 approaches that of the full-state, full-alphabet MLSE equalizer.

In at least one embodiment of the invention, the size of the reduced alphabet is constant for all input symbols within the communication signal. In other embodiments, however, the size of the reduced alphabet can vary from one input symbol to another within the communication signal. The optional alphabet size determination unit 18 is operative for determining the size K of the reduced alphabet for each input symbol. In one approach, the alphabet size determination unit 18 determines the size of the reduced alphabet based on an output signal of the reduced complexity equalizer 12. For example, a smaller reduced alphabet size can be used when the reduced complexity equalizer 12 indicates a high probability of accurate detection. Similarly, a larger reduced alphabet size can be used when the reduced complexity equalizer 12 indicates a lower probability of accurate detection. In this manner, additional improvements in the performance/complexity ratio can be achieved. It should be appreciated that the equalization system 10 of FIG. 1 can be modified to include more than two iterations. For example, an equalization system having three or more iterations can be implemented where each subsequent iteration uses a smaller alphabet size and a longer memory length.

Figure 2:
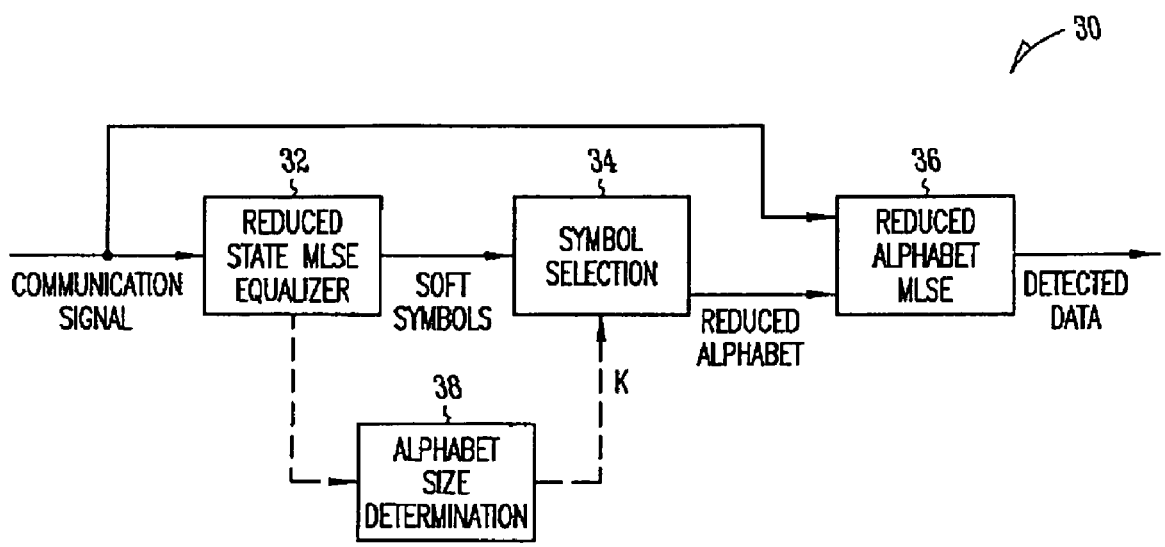
FIG. 2 is a block diagram illustrating an equalization system in accordance with another embodiment of the present invention.

FIG. 2 is a block diagram illustrating an equalization system 30 in accordance with an embodiment of the present invention. As illustrated, the equalization system 30 includes a reduced state MLSE equalizer 32, a symbol selection unit 34, and a reduced alphabet MLSE 36. An optional alphabet size determination unit 38 may also be provided. The reduced state MLSE equalizer 32 is an MLSE equalizer having a length that is significantly less than the memory length of the wireless channel (e.g., a delayed decision feedback sequence estimator (DDFSE), a reduced state sequence detection (RSSD) equalizer, etc.). The reduced state MLSE equalizer 32 processes the communication signal to generate a plurality of soft symbols at an output thereof. Each of the soft symbols has a probability associated with it that represents the probability that the soft symbol is the actual symbol that was transmitted (i.e., for a particular input symbol). The soft symbols are delivered to the symbol selection unit 34 which selects the K most probable symbols from the soft symbols (where K is a positive integer). The K most probable symbols are then output as the reduced alphabet to the reduced alphabet MLSE 36. As before, the reduced alphabet MLSE 36 processes the communication signal to determine which of the symbols of the reduced alphabet is most likely the transmitted symbol.

As described above, an optional alphabet size determination unit 38 may be used to determine a value for K (i.e., the reduced alphabet size) on an input symbol by input symbol basis. In one approach, the alphabet size determination unit 38 determines the size of the reduced alphabet for a particular input symbol based on the probability associated with the highest probability soft symbol output by the reduced state MLSE equalizer 32 for that input symbol. In another approach, K is selected so that the sum of the probabilities of the K most probable symbols exceeds a predetermined threshold value. As will be appreciated, many alternative methods for dynamically varying the size of the reduced alphabet also exist. Alternatively, a constant K value can be used for all input symbols.

Figure 3:
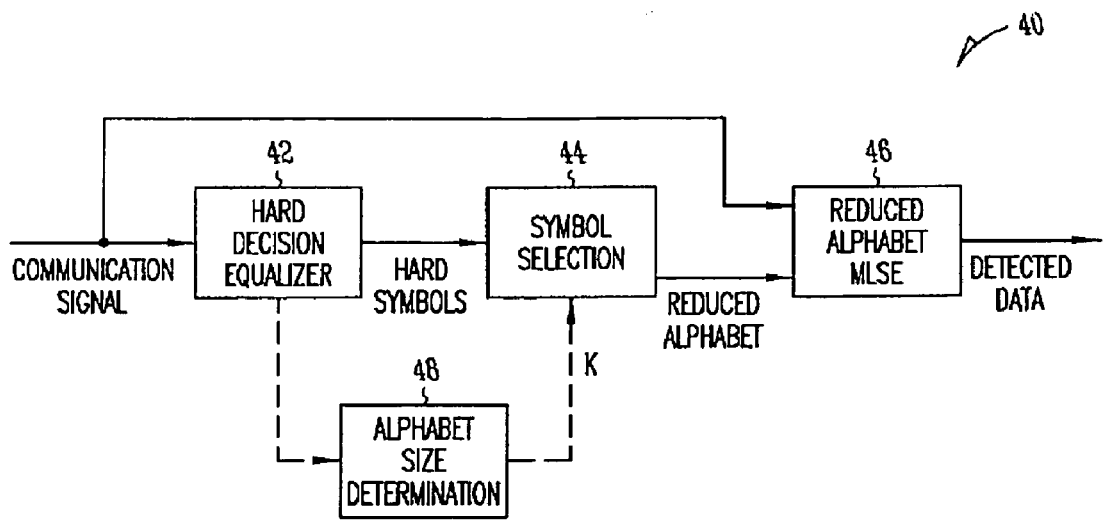
FIG. 3 is a block diagram illustrating an equalization system in accordance with yet another embodiment of the present invention.

FIG. 3 is a block diagram illustrating an equalization system 40 in accordance with another embodiment of the present invention. As illustrated, the equalization system 40 includes a hard decision equalizer 42, a symbol selection unit 44, and a reduced alphabet MLSE 46. An optional alphabet size determination unit 48 may also be provided. The hard decision equalizer 42 processes the communication signal to generate a hard symbol for each of the input symbols. The symbol selection unit 44 then selects the K-1 symbols from the fill alphabet that are closest in distance to the hard symbol. These K symbols are then output as the reduced alphabet. As before, the reduced alphabet MLSE 46 processes the communication signal to determine which of the symbols of the reduced alphabet is most likely the transmitted symbol. The optional alphabet size determination unit 48 can determine the value of K based upon, for example, a probability associated with the hard symbol. Alternatively, a constant K value can be used for all input symbols.

Figure 4:
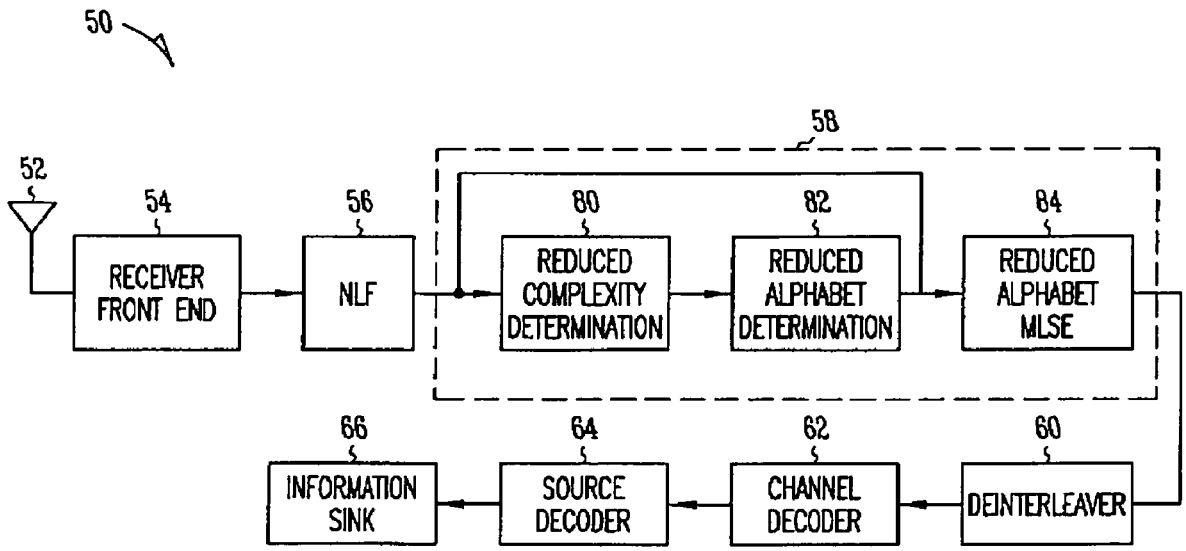
FIG. 4 is a block diagram illustrating functionality within a wireless communication device in accordance with an embodiment of the present invention.

As will be appreciated, the inventive principles will most often be implemented within a wireless communication device. The wireless communication device can be either mobile (e.g., a handheld communicator, a laptop computer or personal digital assistant (PDA) having wireless transceiver functionality, etc.) or stationary (e.g., a wireless basestation, etc.). FIG. 4 is a block diagram illustrating receiver functionality within a wireless communication device 50 in accordance with an embodiment of the present invention. As shown, the communication device 50 includes: an antenna 52, a receiver front end 54, a noise limiting filter (NLF) 56, an equalization system 58, a deinterleaver 60, a channel decoder 62, a source decoder 64, and an information sink 66. The antenna 52 receives a signal from a wireless communication channel and delivers the signal to the receiver front end 54. The front end 54 converts the received signal to a baseband representation and the NLF 56 filters the baseband signal to limit noise therein. The equalization system 58 then processes the signal to detect the most likely symbols therein, as described previously. As shown, the equalization system 58 includes: a reduced complexity equalizer 80, a reduced alphabet determination unit 82, and a reduced alphabet MLSE equalizer 84. The output signal of the equalization system 58 is then deinterleaved in the deinterleaver 60. Channel and source coding is then removed from the signal in the channel decoder 62 and the source decoder 64, respectively. The resulting information is then delivered to the information sink 66 (e.g., a user device, a memory, etc.).

Figure 5:
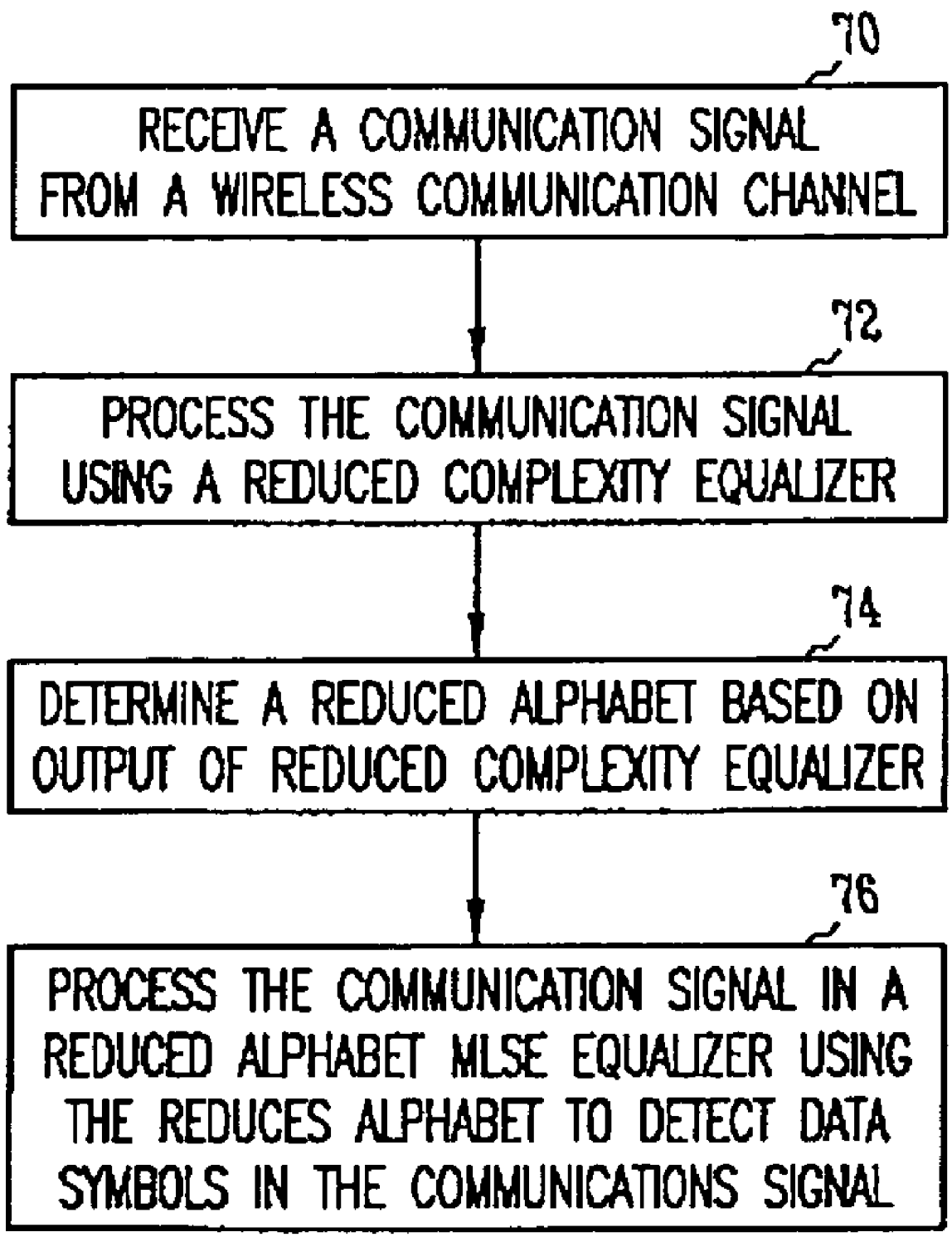
FIG. 5 is a flowchart illustrating a method for equalizing a communication signal in accordance with an embodiment of the present invention.

FIG. 5 is a flowchart illustrating a method for equalizing a communication signal in accordance with an embodiment of the present invention. First, a communication signal is received from a wireless communication channel (block 70). Next, the communication signal is processed using a reduced complexity equalizer (block 72). The reduced complexity equalizer can include, for example, a DDFSE equalizer, an RSSD equalizer, an M-algorithm equalizer, an SA(B,C) detector, a linear equalizer, any of a plurality of hard decision equalizers, and others. The output of the reduced complexity equalizer is then used to determine a reduced alphabet (block 74). The communication signal is then processed in a reduced alphabet MLSE equalizer based on the reduced alphabet (block 76). In one embodiment, the reduced alphabet MLSE equalizer is a full-state MLSE unit.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An equalization system comprising:
a first equalizer to process a communication signal received from a communication channel to generate an output;
a reduced alphabet determination unit to identify a reduced alphabet having K symbols where K is a positive integer, the reduced alphabet based on said output of said first equalizer;
an alphabet length determination unit for determining a value for K based on an output of said first equalizer; and
a reduced alphabet MLSE equalizer to detect data in said communication signal received from said communication channel based on said reduced alphabet identified by said reduced alphabet determination unit.

2. The equalization system of claim 1, wherein:
said first equalizer has a length that is less than an anticipated memory length of said communication channel.

3. The equalization system of claim 1, wherein:
said first equalizer includes a reduced length MLSE equalizer.

4. The equalization system of claim 1, wherein:
said first equalizer includes a delayed decision feedback sequence estimation (DDFSE) equalizer.

5. The equalization system of claim 1, wherein:
said first equalizer includes a linear equalizer.

6. The equalization system of claim 1, wherein:
said first equalizer includes an M-Algorithm equalizer.

7. The equalization system of claim 1, wherein:
said first equalizer includes an SA(B, C) detector.

8. The equalization system of claim 1, wherein:
said reduced alphabet MLSE equalizer is a full-state MLSE equalizer.

9. The equalization system of claim 1, wherein:
said output of said first equalizer includes a plurality of soft symbols each having a corresponding probability, wherein said reduced alphabet determination unit selects the K highest probability soft symbols from said output as said reduced alphabet, where K is a positive integer.

10. The equalization system of claim 1, wherein:
said output of said first equalizer includes a single symbol, wherein said reduced alphabet determination unit selects K−1 symbols from a full alphabet that are closest in distance to said single symbol as said reduced alphabet, where K is a positive integer greater than 1.

11. The equalization system of claim 1, wherein:
said alphabet length determination unit determines a value for K on an input symbol by input symbol basis.

12. The equalization system of claim 1, wherein:
said alphabet length determination unit determines a value for K based on a probability associated with a highest probability soft symbol output by said first equalizer for a particular input symbol.

13. The equalization system of claim 1, wherein:
said alphabet length determination unit determines a value for K so that a cumulative probability of the K highest probability soft symbols output by said first equalizer exceeds a threshold value.

14. A method for performing equalization within a communication system, comprising:
first processing a communication signal using a first equalizer;
determining a reduced alphabet based on a result of said first processing, wherein the reduced alphabet is of size K and wherein K is a positive interger;
second processing said communication signal using a reduced alphabet MLSE equalizer, said reduced alphabet MLSE equalizer operating on said communication signal based on said reduced alphabet; and
redetermining K for successive input symbols within said comunication signal.

15. The method of claim 14, wherein:
said first equalizer includes a reduced state MLSE equalizer.

16. The method of claim 14, wherein:
first processing includes generating a plurality of soft symbols having associated probabilities.

17. The method of claim 16, wherein:
determining a reduced alphabet includes selecting the K highest probability soft symbols from said plurality of soft symbols as the reduced alphabet, where K is a positive integer.

18. The method of claim 14, wherein:
first processing includes generating a hard symbol and determining includes selecting the K−1 symbols within a full alphabet that are closest in distance to said hard symbol, where K is a positive integer greater than 1.

19. The method of claim 14, wherein:
second processing includes processing said communication signal in a full-state, reduced alphabet MLSE equalizer.

20. A computer readable medium having program instructions stored thereon for implementing, when executed within a digital processing device, a method for performing equalization within a communication system, said method comprising:
first processing a communication signal using a first equalizer;
determining a reduced alphabet based on a result of said first processing, wherein a size of the reduced alphabet is related to at least one of a symbol probability determined during first processing or a coding distance determined during first processing; and
second processing said communication signal using a reduced alphabet MLSE equalizer, said reduced alphabet MLSE equalizer operating on said communication signal based on said reduced alphabet.

21. The computer readable medium of claim 20, wherein:
determining a reduced alphabet includes determining a reduced alphabet for each input symbol within said communication signal.

22. An equalization system comprising:
a reduced state, full-alphabet MLSE equalizer to process a communication signal received from a communication channel to generate a plurality of soft symbols for a first input symbol within said communication signal, said plurality of soft symbols having corresponding symbol probabilities;
a symbol selection unit to select symbols from said plurality of soft symbols to form a reduced alphabet for said first input symbol; and
an alphabet size determination unit to determine a value for K for each inputs symbol within said communication signal based on symbol probabilities output by said reduced state, full-alphabet MLSE equalizer; and
a full-state, reduced alphabet MLSE equalizer to process said communication signal based on said reduced alphabet.

23. The equalization system claimed in claim 22, wherein:
said symbol selection unit selects, for said first input symbol, the K highest probability soft symbols output by said reduced state, full-alphabet MLSE equalizer to form said reduced alphabet, where K is an integer greater than 1.

24. A communication device, comprising:
means for receiving a communication signal from a communication channel, said communication signal including undetected input symbols selected from a full symbol alphabet;
means for determining, for individual input symbols within said communication signal, a reduced symbol alphabet having symbols that are more likely to be an actual transmitted symbol than other symbols within said full symbol alphabet; wherein said means for determining includes means for dynamically adjusting a size of said reduced symbol alphabet for successive input symbols within said communication signal; and
a full-state MLSE equalizer for processing said communication signal based on said reduced symbol alphabet.

25. The communication device of claim 24, wherein:
said means for determining includes a reduced complexity equalizer.

* * * * *

UNITED STATES PATENT AND TRADEMARK OFFICE
CERTIFICATE OF CORRECTION

PATENT NO.      : 7,224,724 B2
APPLICATION NO. : 09/901413
DATED           : May 29, 2007
INVENTOR(S)     : Krupka It is certified that error appears in the above-identified patent and that said Letters Patent is hereby corrected as shown below:

In column 5, line 57, in Claim 7, delete "(B, C)" and insert -- (B,C) --, therefor.

In column 6, line 26, in Claim 14, delete "interger;" and insert -- integer; --, therefor.

In column 6, line 32 (Approx.), in Claim 14, delete "comunication" and insert -- communication --, therefor.

In column 7, line 15, in Claim 22, after "alphabet" insert -- of size K --.

In column 7, line 16, in Claim 22, after "symbol;" delete "and".

In column 7, line 18, in Claim 22, delete "inputs" and insert -- input --, therefor.

In column 8, line 15 (Approx.), in Claim 24, after "alphabet" delete ";" and insert -- , --, therefor.

Signed and Sealed this

Seventh Day of August, 2007

JON W. DUDAS
*Director of the United States Patent and Trademark Office*